Jan. 12, 1943.   R. N. WENZEL   2,308,409
GLASS SOLUTION AND GLASS COATING
Filed March 16, 1940

Asbestos impregnated with glass

WITNESSES:

INVENTOR
Robert N. Wenzel.
BY
ATTORNEY

Patented Jan. 12, 1943

2,308,409

UNITED STATES PATENT OFFICE 2,308,409

GLASS SOLUTION AND GLASS COATING

Robert N. Wenzel, Swissvale, Pa., assignor to Westinghouse Electric & Manufacturing Company, East Pittsburgh, Pa., a corporation of Pennsylvania Application March 16, 1940, Serial No. 324,450

20 Claims. (Cl. 174—121)

This invention relates to glass and more particularly to a solution of glass.

This application is related to the copending application of Robert N. Wenzel, Glass solutions, Serial No. 324,449, filed March 16, 1940.

Heretofore, coatings of glass and ceramic materials were applied to members either as a suspension of a vitreous frit in an aqueous medium with subsequent heating to drive off the aqueous medium, followed by firing to fuse the residue or by sifting powdered glazes upon heated members and firing within furnaces.

In the case of porous or fibrous materials, both of these methods are unsatisfactory in securing penetration of a glass or glaze into the porous material.

The object of this invention is to provide for applying glass from a solution.

A further object of the invention is to provide for impregnating porous members with glass from a solution.

Another object of the invention is to provide for conditioning porous materials with a glass solution for subsequent impregnation with fused glass.

Other objects of the invention will in part be obvious and will in part appear hereinafter.

The invention, accordingly, comprises the several steps and the relation and order of one or more of such steps with respect to each of the others and the article possessing the features, properties and the relation of elements which are exemplified in the following detailed description and the scope of the application of which will be indicated in the claims.

Figure 1:
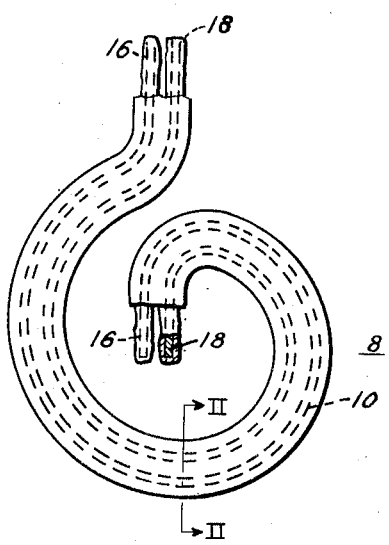
Figure 2:
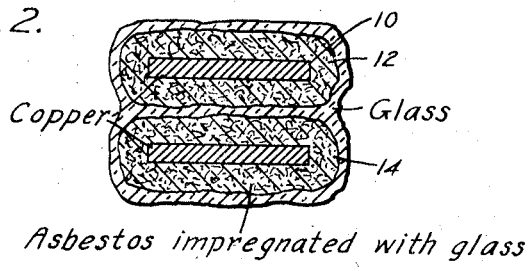

For a fuller understanding of the nature and objects of the invention, reference should be had to the following detailed description taken in connection with the accompanying drawing, in which:

Figure 1 is an elevational view of a coil covered with asbestos and impregnated or coated with glass, Fig. 2 is an enlarged sectional view taken on the line II—II of Fig. 1.

This invention is based upon the application of glass in solution for the coating of articles. In particular, it has been discovered that lead borate glasses and glasses predominating in lead borate may be put into solution in polyhydric alcohols.

The base ingredients of lead borate, lead oxide (PbO) and boric oxide ($B_2O_3$), may be introduced as a mechanical mixture in powdered form and will dissolve in polyhydric alcohols upon heating.

Commercial sources of lead oxide may be minium ($Pb_3O_4$) or litharge (PbO). Boric oxide may be supplied either as boric acid ($H_3BO_3$) or its anhydride ($B_2O_3$).

Almost any proportion of lead oxide to boric oxide may be put into solution in liquid polyhydric alcohols. From the standpoint of this application it is generally preferable that the proportion of boric oxide be less than 40% in the glass, since lead borate glasses having over 40% of boric oxide are attacked by moisture and are somewhat soluble in water. For many purposes, especially for use in the electrical industries, coatings of glass having over 40% boric acid would therefore be disadvantageous. In applications not susceptible to moisture, this feature may not be material and any predetermined range of lead oxide to boric oxide may be put into solution and employed in making coatings.

The polyhydric alcohol solvents which have been found partially advantageous in dissolving the lead borates are ethylene glycol, diethylene glycol and glycerine. These polyhydric alcohols will dissolve more lead borate and be more fluid for a given concentration of lead borate than polyhydric alcohols of higher molecular weight. However, other polyhydric alcohols and glycols, which are liquids, may be employed as solvents in this application. In addition, mixtures of polyhydric alcohols may be employed.

Furthermore, it has been discovered that lead borate glass made in the usual way by fusion of the oxides at high temperature can be dissolved in polyhydric alcohols. Solution of the glass is hastened by fine pulverizing.

Certain third components may be put into solution along with lead borate and thus a three component glass may be present in a given solvent.

Among the third components which may be put into solution with lead borate are silica as silicic acid, calcium oxide and calcium hydroxide, and the alkali metal oxides and hydroxides.

These third components may be introduced into a solution already containing lead borate or else dissolved in a polyhydric alcohol solvent and the lead borate added thereafter.

A specific solution containing lead borate may be prepared as follows: To 350 grams of ethylene glycol is added 35.5 grams of powdered boric acid and 130 grams of litharge, these proportions providing a 30% solution. The mixture is heated and stirred. Solution is more rapid at higher temperatures. A temperature of 120° C. is sufficient to effect solution of the powdered solids but the time required is rather long. At 140° to 150° C. this particular mixture will completely dissolve in about 6 hours. Small quantities in a test tube, heated to about the boiling point of ethylene glycol at approximately 210° C., will dissolve in about 15 minutes. In all cases mechanical stirring increases the speed of solution.

A 45% solution of lead borate may be effected by adding 33.2 grams of boric acid and 117.7 grams of litharge to a 30% solution prepared as above. At the end of 20 hours of additional heating at 140° to 150° C., these ingredients will be in solution. The 45% solution thus produced will be a clear, heavy, mobile liquid of a specific gravity of 1.88.

Transparent solutions of a very light color are prepared by effecting solution in inert atmospheres. In air, prolonged heating over a period of hours results in a dark though still transparent solution.

An alternative method of preparing highly concentrated solutions from a 30% lead borate-ethylene glycol solution is by distillation at reduced pressures. Solutions having 45% to 55% of lead borate are readily obtained by distilling at reduced pressures.

Calcium oxide may be added directly to a 30% lead borate-ethylene glycol solution. On the other hand, calcium oxide may be dissolved first in ethylene glycol and the lead borate added thereafter and put into solution with heat and stirring.

The alkali metals are conveniently put into solution along with lead borate by dissolving the corresponding powdered alkali metal borate, for example, sodium is introduced into the polyhydric alcohol as borax. The addition of lead oxide to the solution gives a soda-lead-borate glass solution.

Silica may be added in quantities up to 7½% of the glass by employing a solution of silicic acid in ethyl alcohol. The solution of silicic acid in ethyl alcohol is mixed with diethylene glycol and heated to drive off the ethyl alcohol, leaving silicic acid dissolved in the diethylene glycol. Lead borate powder or pulverized litharge and boric acid may be dissolved in the silicic acid solution by heating to give the desired three component solution. Alternatively, the silicic acid-glycol solution may be mixed with a lead-borate solution. Thus a typical solution was prepared having a solute of composition 74.2% lead oxide, 18.9% boric oxide and 6.9% silicon dioxide, dissolved to a concentration of 23.3% in a mixture of ethylene glycol and diethylene glycol.

The solution of lead borate or of a composition having predominating amounts of lead borate may be applied to various members by dipping, brushing, spraying or other well known methods of applying liquids to members as coatings. In some cases the member thus coated may be used without removal of the solvent or further processing of the coating. Upon heating to temperatures above the boiling point of the specific solvent employed, the solvent may be driven off and a deposit of glass will be left behind. At temperatures below 250° C., the deposit is generally a hard, clear, gelatinous film that is somewhat flexible. In some instances the member may be used with this coating. It is believed that this film contains a small quantity of the solvent since upon heating to temperatures above 500° C., the film chars, probably due to the carbon formed during the decomposition of the remainder of the solvent. At temperatures of 500 to 550° C., the film becomes transparent and is a smooth glaze.

Various porous or fibrous materials may be impregnated with the solution of lead borate in the polyhydric alcohol solvent. Such materials as felted asbestos, asbestos paper cemented to a cotton cloth base which is known as Rhinobestos and disks of carborundum and alundum will be wetted by the solutions of lead borate glasses.

For example, felted asbestos will absorb a 30% lead borate solution in ethylene glycol at room temperatures. A 45% solution of lead borate will wet asbestos at 100° C. However, 55% lead borate solutions in ethylene glycol are extremely viscous and will not penetrate asbestos felt even at temperatuers about 200° C. Above 200° C. the 55% solutions tend to char slightly.

For the purpose of impregnating or wetting asbestos felt with a solution of lead borate, ethylene glycol is preferable to any other solvent. The viscosity of 45% lead borate solution in ethylene glycol does not exceed that of a 30% solution of lead borate in either glycerine or diethylene glycol. Thus greater quantities of glass may be carried for a given amount of solution applied. The members may be made use of in this state without removing the solvent.

The coated felted asbestos, Rhinobestos, and disks of carborundum or alundum may be made use of by simply drying the coating until a hard gelatinous film is formed. The temperatures for drying should be just slightly above the boiling point of the solvent. When kept out of contact with the atmosphere, the film will have desirable electrical properties.

The solution is particularly useful in impregnating porous and fibrous members with glass. Ordinarily felted asbestos will not be wetted by fused glass. A felted asbestos pad with a quantity of vitreous frit placed upon its surface and heated in an oven until the frit is fused will not absorb or be wetted by the fused frit. A molten bead forms on the asbestos. This property of not being wetted by molten glasses renders it impractical to attempt to add molten glass to felted asbestos by any of the known prior art methods.

If a slip or enamel containing a finely pulverized vitreous frit is applied to felted asbestos, the frit particles are filtered out and merely remain on the surface. When placed within a furnace and heated until the deposit of frit or enamel fuses, the resulting glaze only coats the external surface of the felted asbestos. Substantially none of the glaze penetrates the felted asbestos.

Felted asbestos when wetted with a 45% solution of lead borate in ethylene glycol by dipping and thereafter heated to drive off the solvent until the residue becomes substantially a transparent glaze, exhibits an unusual change in its properties. Every fiber of the felted asbestos will now be coated with the glaze. Furthermore, the felted asbestos so preconditioned will now be readily wetted by additional applications of glazes or glass in the fused state. In this manner a felted asbestos member may be coated with glass sufficient to fill all the pores or interstices of the felted asbestos.

For example, electrical coils covered with felted asbestos as an insulating medium were treated with a 45% lead borate-ethylene glycol solution. After drying the felted asbestos did not appear much different from its original appearance, except for being slightly darker. Upon heating to 550° C., the solvent was completely driven off and a transparent glaze was present throughout the felted asbestos fibers. The asbestos gained 87% in weight of glass. Thereafter an enamel comprising a lead borate frit ground to pass a 100-mesh sieve and milled with 3% of enameler's clay and 40% water was applied to the preconditioned felted asbestos. Upon firing to 550° C., the felted asbestos gained an additional 194% in weight of glass. This glass was distributed throughout the felted asbestos mass. A succeeding application of enamel gave an additional 210% increase in weight. Thus the coil had sufficient glass deposited within the asbestos coating to equal about 5 times the weight of the asbestos itself. Even with such extensive applications of glass, so thorough was the absorption that very little of the enamel thus applied was apparent at the surface of the felted asbestos. There was no appreciable alteration in dimensions. Moreover, additional amounts of enamel may be added to give a solid glass surface. The coil will appear as if the asbestos were embedded in a block of glass.

Figs. 1 and 2 of the drawing show a twin wound coil 8 treated according to the invention. In the figures, 10 represents the copper conductor and 12 represents felted asbestos, impregnated with glass, upon the copper conductor to act both as an insulator and a spacing member.

The felted asbestos 12 is impregnated with glass by applying the lead borate solution and heat treating the coil to remove all the solvent. The asbestos is preconditioned by this treatment for additional applications of vitreous enamel. Upon heating of the enamel to fusion the asbestos will absorb the fused enamel until a solid coating is obtained. The final external coating of glass 14 is applied to form solid glass insulation.

The bare copper leads 16 and 18 of the coil may be simultaneously coated with the glass during the treatment of the asbestos and will have a film of glass protecting the copper from oxidation. In a test coil, the copper at 16 and 18 below the glass coating was quite red in appearance.

Almost any desired proportion of glass may be applied to the felted asbestos. Successive applications of the lead borate solution may be employed to convey sufficient glass into the body of the asbestos. However, repeated application of the solution is not as convenient for obtaining complete filling of the asbestos as is the application of fused enamels following pretreatment with the solution.

The fused enamel subsequently applied need not be of the same composition as the glass applied from solution.

Materials comprising relatively massive granular particles bonded together and with interstices present may be impregnated with glass from the solution. Refractory materials bonded in this manner, such as carborundum disks, are commonly used in many electrical installations. These disks normally are impenetrable to fused glass. A particle of fused glass on the surface will refuse to wet the carborundum and will assume a spherical shape.

Raising the temperature to further lower the viscosity of the glass, in the attempt to cause it to penetrate the carborundum disk, merely results in particles of carborundum being picked up by the molten glass bead.

Treatment of porous bonded members by dipping or brushing the disks with a lead borate-polyhydric alcohol solution with subsequent firing will give a thorough impregnation of glass throughout the member. After such a treatment, enamels or frits may be applied to and fused on the surface of the member, such as a carborundum disk, and the fused glass if of sufficiently low viscosity will immediately penetrate the carborundum disk. Carborundum disks may be treated in the same manner as felted asbestos to build up a solid glass body.

Asbestos covered coils impregnated or coated with the lead borate glass deposited from solution with subsequent applications of a fused glass have excellent dielectric properties. Insulation resistance tests of twin wound coils between turns gave values from 1250 to 5000 megohms at room temperature. The insulation provided by lead borate glasses is sufficient to provide for satisfactory turn to turn electrical insulation up to 300° C. and higher. At 300° C. the insulation resistance is of the order of 4 meghoms. The dielectric strength varies with the thickness of the glass film rising from 250 to 400 volts per mil as the thickness decreases from 80 to 40 mils. The dielectric strength mounts with increasing rapidity for thinner coatings.

Members formed of powdered and sintered metals with porous structures may be impregnated with glass according to the invention. Stranded metallic members may also be coated with glass by application of the solution of lead borate glass.

While I have shown and described several embodiments of my invention in accordance with the patent statutes, it is obvious that various changes may be made in the structural details without departing from the spirit of the invention. I desire, therefore, that the invention be limited only by the reasonable construction of the language of the appended claims and by the prior art.

I claim as my invention:

1. An article of manufacture comprising a base member and a coating on the base member derived from a solution of a lead borate type glass in a polyhydric alcohol solvent applied to the base member and dried at a temperature below 250° C. to provide an unfused coating.

2. An article of manufacture comprising a base member, a covering of a porous material upon portions of the base member and a coating impregnating the porous material, the coating being composed of a solution of a lead oxide-boric oxide base glass in a polyhydric alcohol applied at a predetermined temperature and viscosity for penetration of and to be retained by the porous material.

3. An article of manufacture comprising a base member, a layer of a porous material capable of withstanding the temperatures at which glass fuses upon a portion of the base member, a preconditioning coating of a lead borate base glass carried by the porous material and penetrating to the base material, the preconditioning coating of glass serving as a wetting assistant to precondition the porous material to provide for the penetration of fused glass, and at least one additional coating of a fused glass applied to the preconditioned porous material.

4. An article of manufacture comprising a base member, a porous material capable of withstanding the temperature at which glass fuses carried by the base member, a preconditioning coating of a lead borate base glass carried by the porous material and penetrating to the base member, the preconditioning coating of glass serving as a wetting assistant to precondition the porous material to provide for the penetration of an application of a fused glaze, the wetting assistant having been introduced as a solution of a soluble glass in a polyhydric alcohol solvent applied under conditions to effect the saturation of the porous material and the solvent being removed to leave a coating of the glass throughout the porous material, and at least one additional coating of a fused glaze being applied to the preconditioned porous material to provide for a coating of glass on the base member.

5. A vitreous coated article, comprising, in combination, a porous base member composed of bonded granular particles with interstices therebetween, and a glass present in the interstices between the particles, the glass being applied as a coating to the porous base member from a solution of a lead borate base glass in a polyhydroxy alcohol solvent, the solution of glass penetrating the porous base member and the solvent being thereafter removed to leave a deposit of the glass on the particles.

6. A vitreous coated article, comprising, in combination, a porous base member composed of bonded granular particles with interstices therebetween, and a glass present in the interstices between the particles, the glass being applied as a coating to the porous base member from a solution of a lead borate base glass in a polyhydroxy alcohol solvent, the solution of glass penetrating the porous base member and the solvent being thereafter removed to leave a deposit of the glass on the particles, the coating of glass serving as a wetting assistant to precondition the porous material for reception of subsequent applications of fused glass, and a subsequent coating of fused glass applied to the preconditioned porous material to build up a predetermined amount of glass upon the granular particles.

7. A vitreous coated material, comprising in combination an inorganic fibrous base material and a glass coating upon and between the fibers of the fibrous base material, the glass coating composed of a glass applied to the fibrous base material from a solution of a lead borate base glass in a polyhydroxy alcohol solvent, the solution of the glass penetrating the base material and the polyhydroxy alcohol solvent being thereafter removed to leave a deposit of glass on the fibers.

8. A vitreous coated material, comprising in combination an inorganic fibrous base material and a glass coating upon and between the fibers of the fibrous base material, the glass coating composed of a glass applied to the fibrous base material as a solution of a glass in a polyhydroxy alcohol solvent, the solution of the glass penetrating the base material and the polyhydroxy alcohol solvent being thereafter removed to leave a deposit of glass on the fibers, the coating of glass serving as a wetting assistant to precondition the fibrous base material for reception of subsequent applications of fused glass, and a subsequent coating of fused glass applied to the fibrous base material to build up a predetermined amount of glass on the inorganic fibers.

9. In the method of applying glass to members having porous portions capable of withstanding temperatures at which glass fuses comprising in combination, preconditioning the porous portions by wetting the member including the porous portion with a liquid solution of a lead borate base glass dissolved in a polyhydroxy alcohol solvent, removing the solvent to provide for a coating of the glass on the member and penetrating the porous portions, and fusing additional amounts of glass in contact with the preconditioned member whereby the fused glass will penetrate the porous portions.

10. In the method of applying a coating of glass to porous materials capable of withstanding temperatures at which glass fuses normally impenatrable to fused glass, preconditioning the porous material for penetration of a fused glass, by applying to the porous material a liquid solution of a polyhydroxy alcohol solvent and a solute ͡ a lead borate base glass under conditions of perature and viscosity, whereby the porous terial is saturated with the solution, and re ing the solvent to provide for a deposit of the s throughout the porous material.

11. A glass coated material comprising, in bination, a base member, a porous covering ι-pable of withstanding temperatures at which ͺ ᴀss fuses upon selected portions of the base member, a first coating of glass on the base member applied from a liquid solution of a lead borate base glass in a polyhydroxy alcohol solvent, the glass solution penetrating the porous covering and the polyhydroxy alcohol being removed to deposit a layer of glass throughout the porous material, the layer of glass deposited acting as a wetting assistant to precondition the porous material to provide for the penetration of subsequent applications of fused glass, and a subsequent coating of a fused glass applied to the preconditioned porous material to build up a coating of glass of predetermined thickness and uniformity.

12. A glass coated material comprising, in combination, a base member, a porous covering capable of withstanding temperatures at which glass fuses upon selected portions of the base member, a first impregnating coating of glass on the base member applied from a liquid solution of a lead borate base glass in a polyhydroxy alcohol solvent, the glass solution being applied at a temperature and of a viscosity for absorption by the porous material, the glass solution penetrating the porous covering and the polyhydroxy alcohol being removed to deposit a layer of glass throughout the porous material, the layer of glass deposited acting as a wetting assistant to precondition the porous material to provide for the penetration of subsequent applications of fused glass, and a subsequent coating of a fused glass applied to the preconditioned porous material to build up a coating of glass of predetermined amount and uniformity.

13. An article of manufacture comprising a base member and a coating on the base member, said coating derived from a solution of the components of a glass having a predominating amount of lead borate in a polyhydric alcohol solvent applied to the base member and the solvent removed to provide a coating comprising a major proportion of glass.

14. An article of manufacture comprising a base member, a covering of a porous material upon portions of the base member and a coating impregnating the porous material, the coating being composed of a solution of the components of a glass having a predominating amount of lead borate in a ployhydric alcohol applied at a predetermined temperature and viscosity for penetration of and to be retained by the porous material.

15. An article of manufacture comprising, in combination, a porous material and an impregnating coating applied to the porous material, the coating being composed of a glass consisting of predominating amounts of lead oxide and boric oxide, in solution in a liquid polyhydric alcohol, the coating being retained by the porous material.

16. An article of manufacture comprising in combination, a porous material capable of withstanding temperatures at which glass fuses and an impregnating coating of glass in the porous material, the impregnating coating composed of an initial preconditioning layer of a lead borate base glass in the porous material and subsequent amounts of glass in the porous material.

17. An article of manufacture comprising, in combination, a porous member capable of withstanding temperatures at which glass fuses normally non-absorptive of fused glass, an initial impregnating coating of a lead borate base glass in the porous member to provide for preconditioning the porous member for absorption of subsequent applications of fused glass, the initial impregnating coating having been applied as a solution composed of the components of lead borate glass in ethylene glycol, the ethylene glycol having been removed to deposit a layer of glass throughout the porous member.

18. An article of manufacture comprising, in combination, a porous member capable of withstanding temperatures at which glass fuses, normally non-absorptive of fused glass, an initial impregnating coating of a lead borate base glass throughout the porous member to provide for preconditioning the porous member for absorption of subsequent applications of fused glass, the initial impregnating coating having been applied as a solution composed of the components of lead borate glass in ethylene glycol, the ethylene glycol having been removed to deposit a layer of glass throughout the porous member, and a subsequent application of a fused glass to the preconditioned porous member to deposit therein a predetermined amount of glass.

19. An insulated electrical conductor comprising, in combination, a conductor, a porous inorganic insulating covering capable of withstanding temperatures at which glass fuses on the conductor and glass applied to the porous inorganic covering, the glass composed of an initial coating of a lead borate base glass impregnating the porous covering for preconditioning the porous covering and subsequent amounts of fused glass applied to the preconditioned covering to provide for predetermined electric insulation.

20. An insulated electrical conductor comprising, in combination, a conductor, a porous insulating covering capable of withstanding temperatures at which glass fuses composed substantially of inorganic material, and a lead borate base glass applied to the porous covering, the glass impregnating the porous covering material and covering the surface of the conductor to provide for a complete and impervious insulation of the conductor with substantially all inorganic material.

ROBERT N. WENZEL.